(12) United States Patent
Kuehne et al.

(10) Patent No.: US 11,364,867 B2
(45) Date of Patent: Jun. 21, 2022

(54) METHOD FOR OPERATING AN OCCUPANT PROTECTION SYSTEM OF A VEHICLE, AND OCCUPANT PROTECTION SYSTEM FOR A VEHICLE

(71) Applicant: AUDI AG, Ingolstadt (DE)

(72) Inventors: Marcus Kuehne, Beilngries (DE); Daniel Profendiner, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 234 days.

(21) Appl. No.: 16/638,867

(22) PCT Filed: Jul. 18, 2018

(86) PCT No.: PCT/EP2018/069539
§ 371 (c)(1),
(2) Date: Feb. 13, 2020

(87) PCT Pub. No.: WO2019/034357
PCT Pub. Date: Feb. 21, 2019

(65) Prior Publication Data
US 2020/0189508 A1   Jun. 18, 2020

(30) Foreign Application Priority Data
Aug. 16, 2017 (DE) .......................... 102017214296.0

(51) Int. Cl.
*B60R 21/015* (2006.01)
*B60R 21/20* (2011.01)

(52) U.S. Cl.
CPC .. *B60R 21/01512* (2014.10); *B60R 21/01554* (2014.10); *B60R 21/20* (2013.01)

(58) Field of Classification Search
CPC ....... B60R 21/00; B60R 21/01; B60R 21/015; B60R 21/01512; B60R 21/01554; B60R 21/02; B60R 21/16; B60R 21/20
See application file for complete search history.

(56) References Cited

U.S. PATENT DOCUMENTS

| 5,802,479 | A | * | 9/1998 | Kithil | ..................... | B60N 2/002 |
| | | | | | | 257/295 |
| 6,532,408 | B1 | * | 3/2003 | Breed | ................... | B60R 21/013 |
| | | | | | | 180/282 |
| 6,724,920 | B1 | * | 4/2004 | Berenz | ............... | G06K 9/00221 |
| | | | | | | 180/169 |

(Continued)

FOREIGN PATENT DOCUMENTS

| CN | 201042955 Y | 4/2008 |
| CN | 103707781 A | 4/2014 |

(Continued)

OTHER PUBLICATIONS

16638867_Description_English_Translation: translated provided by Espacenet—Patent Translate on Dec. 15, 2021, pp. 1-4 (original document published on Feb. 27, 2003) (Year: 2003).*

(Continued)

*Primary Examiner* — Geepy Pe
*Assistant Examiner* — Michael Allen Brace, Jr.
(74) *Attorney, Agent, or Firm* — Staas & Halsey LLP

(57) ABSTRACT

Upon detecting that an occupant has donned electronic smart glasses, an occupant protection system in a vehicle takes into account that the occupant is wearing electronic smart glasses.

8 Claims, 1 Drawing Sheet

(56) References Cited

U.S. PATENT DOCUMENTS

| | | | |
|---|---|---|---|
| 6,968,263 B1 | 11/2005 | Norton | |
| 2003/0036835 A1* | 2/2003 | Breed | B60R 21/01534 701/45 |
| 2004/0153229 A1* | 8/2004 | Gokturk | G06K 9/00362 701/45 |
| 2004/0240706 A1* | 12/2004 | Wallace | G06T 7/73 382/103 |
| 2005/0248136 A1* | 11/2005 | Breed | B60R 21/0152 280/735 |
| 2006/0018518 A1 | 1/2006 | Fritzsche et al. | |
| 2007/0100525 A1* | 5/2007 | Mattes | B60R 21/01 701/45 |
| 2007/0216144 A1 | 9/2007 | Bannon | |
| 2012/0133884 A1* | 5/2012 | Ishida | G02B 30/24 351/158 |
| 2016/0107591 A1* | 4/2016 | Heo | B60K 37/06 701/2 |
| 2016/0207539 A1* | 7/2016 | Jung | G02B 27/017 |
| 2017/0113641 A1 | 4/2017 | Thieberger et al. | |

FOREIGN PATENT DOCUMENTS

| | | |
|---|---|---|
| CN | 103942527 A | 7/2014 |
| CN | 204832707 U | 12/2015 |
| CN | 106004651 A | 10/2016 |
| DE | 101 37 804 A1 | 2/2003 |
| DE | 102 57 963 A1 | 7/2004 |
| DE | 102012218842 A1 | 4/2014 |
| DE | 102014019579 A1 | 6/2016 |
| DE | 102015007387 | 12/2016 |
| DE | 102016120430 | 4/2017 |
| DE | 102017214296.0 | 8/2017 |
| JP | 2005-301719 A | 10/2005 |
| WO | 03/013912 A1 | 2/2003 |
| WO | 2016/169871 A1 | 10/2016 |
| WO | PCT/EP2018/069539 | 7/2018 |

OTHER PUBLICATIONS

English Translation by WIPO dated Feb. 20, 2020 of the International Preliminary Report on Patentability in corresponding International Patent Application No. PCT/EP2018/069539.

International Search Report for PCT/EP2018/069539 dated Nov. 2, 2018.

German Office Action for Application No. 10 2017 214 296.0 dated Jan. 3, 2018.

Office Action from Chinese Patent Application No. 201880052455.4 dated Sep. 10, 2021.

Chinese Office Action dated Feb. 25, 2022 from Chinese Application No. 201880052455.4, 8 pages.

* cited by examiner

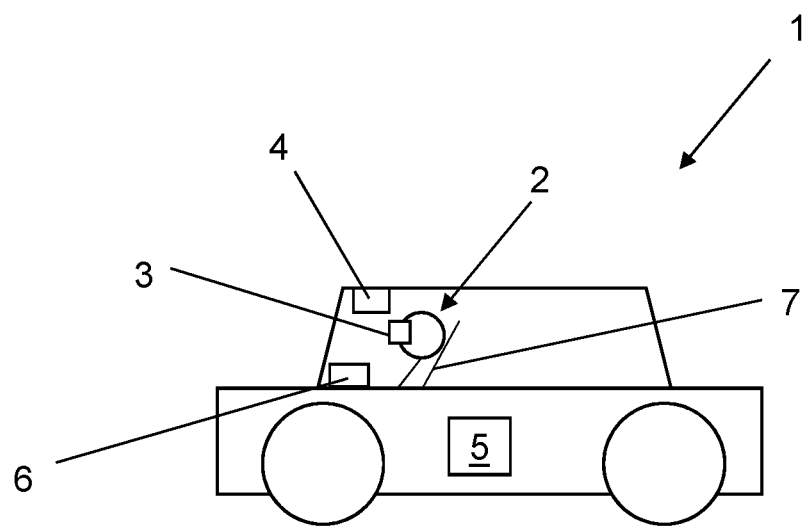

METHOD FOR OPERATING AN OCCUPANT PROTECTION SYSTEM OF A VEHICLE, AND OCCUPANT PROTECTION SYSTEM FOR A VEHICLE

CROSS REFERENCE TO RELATED APPLICATIONS

This application is the U.S. national stage of International Application No. PCT/EP2018/069539, filed Jul. 18, 2018 and claims the benefit thereof. The International Application claims the benefit of German Application No. 10 2017 214 296.0 filed on Aug. 16, 2017, both applications are incorporated by reference herein in their entirety.

BACKGROUND

Described below are a method for operating an occupant protection system of a vehicle and an occupant protection system for a vehicle.

Virtual reality and also augmented reality are permeating areas of life more and more and are soon even likely to perform a function to entertain passengers in vehicles, in particular in motor vehicles. Electronic smart glasses of this kind, be they virtual reality glasses or else augmented reality glasses, have been of significantly heavier and also more complex design to date than conventional glasses for correcting visual impairment or sunglasses, which in certain situations, in particular in an accident situation, can lead to severe impairment in occupant protection systems, for example in air bags or the like.

The use of electronic smart glasses in the form of virtual reality glasses is described in US 2017/0113641 A1, for example. By taking into consideration a relative position of electronic smart glasses donned by a vehicle occupant in relation to an interior of a motor vehicle, the electronic smart glasses are used to show an environment of the motor vehicle. Moreover, this document also describes various air bags in motor vehicles, for example head air bags or else air bags that are intended to protect pedestrians in the event of an impact.

Furthermore, WO 2016/169871 A and DE 102 57 963 A1 describe respective methods in which a position of a vehicle occupant is determined and this is taken as a basis for operating an air bag. By way of example, should the vehicle occupant be positioned such that triggering of the air bag would result in injury, triggering of the air bag is prevented in the event of a crash, or for example the triggering of the air bag is prevented on the basis of a detected head position if the risk of an injury to the affected vehicle occupant is assessed as too high in this position.

SUMMARY

Described below is a method by which safety is increased when wearing electronic smart glasses in vehicles.

The method described herein for operating an occupant protection system of a vehicle involves detecting whether a vehicle occupant has donned electronic smart glasses, wherein the occupant protection system is operated on the basis of whether the vehicle occupant has donned electronic smart glasses. The electronic smart glasses can be for example virtual reality glasses or else augmented reality glasses. Such glasses are currently of similar size to ski goggles, the glasses being of significantly deeper design than conventional ski goggles, in particular in order to be able to accommodate requisite electronics and displays.

The considerations on which the method is based are totally separate from a permission or approval that is sometimes necessary in order to use electronic smart glasses of this kind in a vehicle. It is merely a question of finding suitable mechanisms that can protect occupants from possible injury. Fundamentally, it is also conceivable that the wearing of electronic smart glasses of this kind does not present an increased risk at all in vehicles—in particular also depending on the specific configuration of such glasses.

The method is based on the insight that, specifically when wearing electronic smart glasses of this kind, the risk of injury to vehicle occupants, in particular in the event of a crash, can be substantial. The method thus involves detecting whether a vehicle occupant has actually donned electronic smart glasses. Should this be the case, the occupant protection system is operated on the basis of this insight, namely that the vehicle occupant has donned electronic smart glasses.

To detect whether the vehicle occupant is wearing electronic smart glasses, it is possible for a wide variety of detection devices to be used, such as, for example, known cameras, a time-of-flight camera, in principle any sensors capable of detecting whether a vehicle occupant is currently wearing electronic smart glasses.

As a result of the operation of the occupant protection system being adapted to whether or not a vehicle occupant is currently wearing electronic smart glasses, it is possible for occupant protection to be ensured particularly well even when electronic smart glasses have been donned. In particular in the event of a crash, in the case of which very powerful accelerations and in particular decelerations usually occur, the occupant protection system can be operated such that allowances are made for whether the vehicle occupant is wearing electronic smart glasses. This allows injuries to the wearer of the electronic smart glasses to be reduced or completely prevented in case of necessity, that is to say in particular in the event of an accident. In other words, there is provision in particular for the triggering of specific safety mechanisms of the occupant protection system to take place differently as soon as it is detected that a vehicle occupant is wearing electronic smart glasses than if the vehicle occupant is not wearing electronic smart glasses.

One advantageous embodiment provides for the occupant protection system to have an air bag, wherein at least one parameter determining the trigger behavior of the air bag is adapted in comparison with a standard setting if the vehicle occupant has donned electronic smart glasses. In this case, the method is based on the insight that in particular the triggering of air bags can lead to injuries to vehicle occupants if they have donned electronic smart glasses. As a result of the relevant air bag having its trigger behavior adapted if it is detected that the vehicle occupant is wearing electronic smart glasses, it is possible for injuries to the vehicle occupant on account of the triggering of the air bag to be prevented or at least reduced to a minimum.

A further advantageous embodiment provides for detected electronic smart glasses to result in a relative arrangement, that is to say both in position and in orientation, of the electronic smart glasses in relation to the air bag being ascertained and this being taken as a basis for adapting at least one parameter determining the trigger behavior of the air bag in comparison with a standard setting. In particular, it is also possible to determine where the vehicle occupant wearing the electronic smart glasses is currently sitting in the vehicle. As a result of the relative arrangement of the electronic smart glasses in relation to the relevant air bag being ascertained, the trigger behavior of the air bag for the event of a crash can be adjusted such that the risk of injury to the relevant vehicle occupant when the air bag is triggered is reduced to a minimum despite electronic smart glasses having been donned. Not only is the distance of the electronic smart glasses from the relevant air bag relevant in this case, but also the relative orientation of the electronic smart glasses in relation to the relevant air bag. In comparison with a vehicle occupant who has currently not donned electronic smart glasses, the often bulky dimensions of electronic smart glasses of this kind sometimes increase the risk of injury if the relevant air bag is triggered conventionally. As a result of both the positioning and the orientation of the electronic smart glasses in relation to the relevant air bag being ascertained and taken into consideration, however, the trigger behavior of the air bag can be adapted in optimum fashion and the risk of injury to the wearer of the electronic smart glasses can be reduced to a minimum.

In accordance with a further advantageous embodiment, there is provision for detected electronic smart glasses to result in dimensions of the electronic smart glasses being ascertained and this being taken as a basis for adapting at least one parameter determining the trigger behavior of the air bag in comparison with a standard setting. Should the electronic smart glasses be particularly large, for example, the trigger behavior of the air bag is adjusted differently than if the electronic smart glasses should be relatively small. Furthermore, it is also possible for data relating to the weight of the electronic smart glasses likewise to be taken into consideration for adjusting the trigger behavior of the relevant air bag. By taking into consideration the dimensions and/or the weight of the electronic smart glasses, the risk of injury when the relevant air bag is triggered can be reduced to a minimum despite electronic smart glasses having been donned.

In a further advantageous configuration, there is provision for a trigger time, an order of filling of chambers of the air bag and/or a level of filling of the air bag to be adapted. This can take place solely on the basis of whether it is simply just ascertained whether the relevant vehicle occupant has donned electronic smart glasses, whether the relative arrangement of the electronic smart glasses in relation to the air bag is ascertained or whether dimensions and/or the weight of the electronic smart glasses are also ascertained. The more variables taken into consideration for the electronic smart glasses, the better the parameters determining the trigger behavior of the air bag, in particular a trigger time, an order of filling of chambers of the air bag and/or a level of filling of the air bag, can be adapted so as to minimize the risk of injury to the wearer of the electronic smart glasses in regard to any injuries when the air bag is triggered.

A further advantageous embodiment provides for the air bag to be deactivated while it is detected that the vehicle occupant has donned the electronic smart glasses. This decision can be made dependent on what type of air bag is involved. If for example it is a passenger air bag, where the wearer of the electronic smart glasses has also moved his seat forward to the extent that he is sitting particularly close to the passenger air bag, it may make particular sense for this air bag to be deactivated while it is detected that the vehicle occupant has donned the electronic smart glasses. In the case of other air bags, for example in the case of side air bags or other air bags, it may also make sense for these types of air bags not to be deactivated at all, or to be deactivated only if the electronic smart glasses worn by the vehicle occupant are currently oriented particularly unfavorably in regard to the respective air bags, which would result in an accordingly increased risk of injury accompanying the triggering of the relevant air bags. The deactivation of specific air bags can thus take place in a manner adapted to the situation, in particular by taking into consideration the relative positioning and orientation of the relevant electronic smart glasses in relation to the respective air bag. This allows the risk of injuries to the wearer of the electronic smart glasses, in particular in the event of a crash, to be reduced to a minimum.

In a further advantageous configuration, there is provision for the occupant protection system to comprise an output device by which detected electronic smart glasses result in the vehicle occupant being visually and/or audibly informed of the extent to which he needs to alter a positioning of a vehicle seat in which he is seated in order to minimize a risk of injury in the event of a crash by the vehicle. By way of example, the output device can comprise in-vehicle loudspeakers by which the wearer of the electronic smart glasses is instructed as appropriate. Alternatively or additionally, the output device can also comprise for example one or more displays of the donned electronic smart glasses, by which the wearer of the electronic smart glasses is visually instructed as to how he may need to adjust his vehicle seat in order to minimize a risk of injury in the event of a crash by the vehicle, whether because he then does not hit the donned electronic smart glasses on a rear of a vehicle seat, for example, or, in the case of a passenger and an absent passenger air bag or deactivated passenger air bag, he does not hit them on the dashboard or the like. Moreover, the vehicle occupant is accordingly made more aware that, when the electronic smart glasses have been donned, certain safety mechanisms in the vehicle, in particular air bags, can present a risk, at least if he does not alter his positioning as visually or audibly instructed by adjusting his vehicle seat as appropriate.

A further advantageous embodiment provides for the occupant protection system to have a mechanism by which the electronic smart glasses are actively transported from the head of the vehicle occupant in the event of a crash. By way of example, this mechanism may be part of the electronic smart glasses themselves or else implemented in the vehicle. As a result, it is possible for the electronic smart glasses to be actively removed from the head of the vehicle occupant in the event of a crash, for example in a manner tied to specific threshold values for accelerations. As a result, the risk of injury on account of the electronic smart glasses having been donned, in particular in the event of a crash, can be substantially reduced.

In a further advantageous configuration, there is provision for the occupant protection system to comprise a retaining device arranged on the electronic smart glasses, in particular a retaining belt and/or a clip, which is automatically released in the event of a crash, so that the electronic smart glasses are passively transported from the head of the vehicle occupant. When for example a retaining belt of the electronic smart glasses, a clip or the like is automatically released, the electronic smart glasses fall from the head of the vehicle occupant, for example due to gravity, and hence passively. In the event of a crash, this can also lead to the wearer of the electronic smart glasses no longer being injured by the electronic smart glasses, since he no longer has the electronic smart glasses in front of his face in the event of an impact on an air bag or else on other vehicle components, for example. This can likewise help to substantially reduce the risk of injury to the wearer of the electronic smart glasses.

The occupant protection system for a vehicle includes a detection device and a control device which are designed to perform the method described herein. Advantageous configurations of the method can be regarded as advantageous configurations of the occupant protection system. In particular, the occupant protection system performs the method.

Further advantages, features and details are obtained from the description that follows for exemplary embodiments and with reference to the drawing. The features and combinations of features cited in the description above and the features and combinations of features shown in the description of the drawing below and/or in the drawing alone are usable not only in the respectively indicated combination but also on their own or in other combinations without departing from the scope of the invention.

BRIEF DESCRIPTION OF THE DRAWINGS

The drawing uses a single FIGURE to show a schematic depiction of a motor vehicle in which a vehicle occupant who has donned electronic smart glasses is sitting.

DETAILED DESCRIPTION OF THE PREFERRED EMBODIMENT

Reference will now be made in detail to the preferred embodiment illustrated in the accompanying drawing.

A vehicle occupant 2 who has donned electronic smart glasses 3 is sitting in a motor vehicle 1. The electronic smart glasses 3 may be virtual reality glasses or else augmented reality glasses, for example. The electronic smart glasses 3 are what is known as a head mounted display, often also shortened to HMD, which is a visual output device worn on the head. By way of example, the electronic smart glasses 3 may be of approximately the same width and height as larger ski goggles, their having substantially larger dimensions in the depth direction in order to accommodate electronics and in particular displays.

There is provision in the vehicle for a detection device 4 that is designed to detect whether the vehicle occupant 2 has donned the electronic smart glasses 3. The detection device 4 is furthermore also designed to ascertain the positioning and orientation of the electronic smart glasses 3 relative to the rest of the vehicle. In addition, there is provision in the vehicle for a control device 5 that, inter alia, can control the trigger behavior of an air bag 6 on the basis of whether or not the vehicle occupant 2 has currently donned the electronic smart glasses 3. The detection device 4, the control device 5 and the air bag 6 are part of an occupant protection system, not denoted more specifically in the present case, of the motor vehicle 1.

The detection device 4 is used to monitor, e.g., in an ongoing basis, whether the vehicle occupant 2 has donned the electronic smart glasses 3. For this purpose, the detection device 4 can have optical sensors, cameras, one or more time-of-flight cameras or the like, for example. The occupant protection system of the motor vehicle 1 is operated on the basis of whether the vehicle occupant 2 has donned the electronic smart glasses 3. The control device 5 adapts at least one parameter determining the trigger behavior of the air bag 6 in comparison with a standard setting if the vehicle occupant 2 has donned the electronic smart glasses 3.

In particular, the detection device 4 can also be used to ascertain a relative arrangement of the electronic smart glasses 3 in relation to the air bag 6. The control device 5 can take this as a basis for adapting one or more parameters determining the trigger behavior of the air bag 6 in comparison with a standard setting, that is to say when the vehicle occupant 2 has not donned the electronic smart glasses 3. Moreover, the detection device 4 can also ascertain the dimensions, that is to say in particular the width, height and depth, of the electronic smart glasses 3.

The control device 5 can likewise adapt the trigger behavior of the air bag 6 by taking into consideration the dimensions of the electronic smart glasses 3. The control device 5 can adapt in particular a trigger time, an order of filling of chambers, not depicted more specifically in the present case, of the air bag 6 and/or a level of filling of the air bag 6 on the basis of whether the vehicle occupant 2 has actually donned the electronic smart glasses 3, how the electronic smart glasses 3 are currently oriented and positioned in relation to the air bag 6, how large the electronic smart glasses 3 are, or else on the basis of how heavy the donned electronic smart glasses 3 are. The control device 5 adjusts the parameters determining the trigger behavior of the air bag 6 such that the risk of injury when the air bag 6 is triggered is minimized by taking into consideration the electronic smart glasses 3.

Moreover, it is also possible for the air bag 6 to be deactivated while it is detected that the vehicle occupant 2 has donned the electronic smart glasses 3. This makes sense in particular if the vehicle occupant 2 is very short, for example, and has moved his vehicle seat a particularly long way forward. Should the air bag 6 be a head air bag arranged in a steering wheel, not depicted in the present case, for example, it may even make sense to deactivate the air bag 6 in the extreme situation while the vehicle occupant 2 is simply sitting far too close to the air bag 6 with electronic smart glasses 3 donned.

The occupant protection system, which is not provided with a reference sign more specifically, can moreover have an output device by which detected electronic smart glasses 3 result in the vehicle occupant 2 being visually and/or audibly informed of the extent to which he needs to alter a positioning of his vehicle seat 7 in order to minimize a risk of injury in the event of a crash by the motor vehicle 1 if the electronic smart glasses 3 are still donned. By way of example, applicable information can be shown directly in the field of vision of the vehicle occupant 2 by displays, not depicted more specifically in the drawing, of the electronic smart glasses 3. Alternatively or additionally, it is also possible for in-vehicle loudspeakers to be actuated in order to output this information, for example. Moreover, it is also possible for the vehicle occupant 2 to have donned headphones, for example, by which this information regarding the adjustment of the vehicle seat 7 is output.

As a result of the vehicle occupant 2 being able to be visually and/or audibly instructed in regard to the adjustment of his vehicle seat 7, he becomes more aware that there might be an increased risk of injury if electronic smart glasses 3 are donned. By adjusting the vehicle seat 7, the vehicle occupant 2 can reduce the risk of injury.

Moreover, it is also possible for the occupant protection system, which is not denoted more specifically in the present case, to comprise a mechanism, which is likewise not depicted more specifically in the present case, by which the electronic smart glasses 3 are actively transported from the head of the vehicle occupant 2 in the event of a crash. This mechanism may be part of the electronic smart glasses 3 or else implemented in the vehicle, for example. Should it be detected, for example on the basis of values reported back by acceleration sensors, that an accident involving the motor vehicle 1 can be expected, the mechanism can be operated accordingly by the control device 5, as a result of which the electronic smart glasses 3 are actively transported from the head of the vehicle occupant 2 by the mechanism.

This can take place for example on the basis of whether a side crash, a head-on crash or an overturning is forecast for the motor vehicle 1. Depending on what kind of accident can be expected, it may make sense to operate the mechanism and to remove the electronic smart glasses 3 from the face of the vehicle occupant 2.

Alternatively or additionally, it is also possible for the occupant protection system to comprise a retaining device arranged on the electronic smart glasses 3, for example a retaining belt, not depicted in the present case, and/or a clip, such a retaining belt and/or clip being released automatically, so that the electronic smart glasses 3 are passively transported from the head of the vehicle occupant 2. This can also take place in coordinated fashion in a manner coordinated to the accident situation to be expected for the motor vehicle 1. If for example a side crash can be expected, then it may suffice for the electronic smart glasses 3 to be passively removed from the face of the vehicle occupant 2. If a head-on crash can be expected, however, then for example it may also make sense for the electronic smart glasses 3 not to be passively removed from the facial area of the vehicle occupant 2, since this could be critical if the air bag 6 is triggered, for example.

Furthermore, it is also conceivable for retaining devices to be provided in the vehicle that are able to fix the electronic smart glasses 3 in the event of a crash such that they are not whirled around through the vehicle interior, which could again lead to an increased risk of injury for the vehicle occupant 2.

Overall, the occupant protection system described herein provides an opportunity by which the risk of injury to a vehicle occupant 2 can be substantially reduced despite electronic smart glasses 3 having been donned.

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in *Superguide* v. *DIRECTV*, 358 F3d 870, 69 USPQ2d 1865 (Fed. Cir. 2004).

The invention claimed is:

1. A method for operating an occupant protection system of a vehicle, comprising:
    detecting whether a vehicle occupant has donned electronic smart glasses; and
    operating the occupant protection system depending on whether the vehicle occupant has donned electronic smart glasses, including at least one of
        when the occupant protection system has an air bag, at least one parameter determining trigger behavior of the air bag is adapted in comparison with a standard setting when the vehicle occupant has donned electronic smart glasses, by
            ascertaining a relative arrangement of the electronic smart glasses in relation to the air bag and adapting the at least one parameter based on the relative arrangement, and/or
            ascertaining dimensions of the electronic smart glasses and adapting the at least one parameter based on the dimensions of the electronic smart glasses, and/or
            deactivating the air bag while the vehicle occupant is wearing the electronic smart glasses;
        when the occupant protection system includes an output device, informing the vehicle occupant, via the electronic smart glasses, of an extent of alteration of positioning of a vehicle seat, supporting the vehicle occupant, to minimize a risk of injury upon the vehicle crashing; and
        when the occupant protection system includes a retaining device arranged on the electronic smart glasses, including at least one of a retaining belt and a clip, automatically releasing the retaining device upon the vehicle crashing, whereby the electronic smart glasses may be passively transported from the head of the vehicle occupant.

2. The method as claimed in claim 1, wherein the at least one parameter includes at least one of a trigger time of the air bag, an order of filling of chambers of the air bag and a level of filling of the air bag.

3. The method as claimed in claim 2, wherein the occupant protection system includes a mechanism moving the electronic smart glasses actively from the head of the vehicle occupant upon the vehicle crashing.

4. The method as claimed in claim 1, wherein the occupant protection system includes a mechanism moving the electronic smart glasses actively from the head of the vehicle occupant upon the vehicle crashing.

5. An occupant protection system for a vehicle with a vehicle seat potentially transporting a vehicle occupant wearing electronic smart glasses, comprising:
    a detection device configured to detect whether the vehicle occupant is wearing electronic smart glasses;
    at least one of an air bag, an output device and a retaining device arranged on the electronic smart glasses; and
    a control device configured to operate the occupant protection system depending on whether the vehicle occupant is wearing electronic smart glasses, including at least one of
        adapt at least one parameter determining trigger behavior of the air bag, in comparison with a standard setting, when the vehicle occupant is wearing the electronic smart glasses, by
            ascertaining a relative arrangement of the electronic smart glasses in relation to the air bag and adapting the at least one parameter based on the relative arrangement, and/or
            ascertaining dimensions of the electronic smart glasses and adapting the at least one parameter based on the dimensions of the electronic smart glasses, and/or
            deactivating the air bag while the vehicle occupant is wearing the electronic smart glasses;
        inform the vehicle occupant, via the electronic smart glasses, of an extent of alteration of positioning of the vehicle seat to minimize a risk of injury upon the vehicle crashing, and
        automatically release the retaining device arranged on the electronic smart glasses, including at least one of a retaining belt and a clip, upon the vehicle crashing, whereby the electronic smart glasses may be passively transported from the head of the vehicle occupant.

6. The occupant protection system as claimed in claim 5, wherein the at least one parameter includes at least one of a trigger time of the air bag, an order of filling of chambers of the air bag and a level of filling of the air bag.

7. The occupant protection system as claimed in claim 6, further comprising a mechanism moving the electronic smart glasses actively from the head of the vehicle occupant upon the vehicle crashing.

8. The occupant protection system as claimed in claim 5, further comprising a mechanism moving the electronic smart glasses actively from the head of the vehicle occupant upon the vehicle crashing.

* * * * *